UNITED STATES PATENT OFFICE.

ERNESTO LURATI, OF TRAUN, NEAR LINTZ, AUSTRIA-HUNGARY.

PROCESS OF FIXING DYES ON INDIGO.

SPECIFICATION forming part of Letters Patent No. 700,521, dated May 20, 1902.

Application filed July 11, 1901. Serial No. 67,934. (No specimens.)

*To all whom it may concern:*

Be it known that I, ERNESTO LURATI, a citizen of the Empire of Austria-Hungary, residing at Traun, near Lintz, Upper Austria, Austria-Hungary, have invented a new and Improved Process of Fixing Dyestuffs upon Indigo, of which the following is a specification.

Ever since azo dyestuffs produced "on the fiber" have made their appearance the important problem of fixing them onto indigo has engaged the attention of the (calico) printing industry and its solution has been variously and with varying success attempted in many quarters. Nevertheless, all the suggestions made hitherto have proved ineffectual in practice, either because the colors obtained were deficient in "fire" or because the cotton fiber would lose some of its strength in the process. The improved process herein described provides a means whereby dyes which are both reliably fixed and sufficiently "fiery" may be produced without in the least affecting the strength of the fiber.

In accordance with this invention the cotton is subjected to preparatory treatment in an alkaline solution of alpha or beta naphthol, to which Turkey-red oil may be added as required. To the cotton thus prepared there is locally applied a dye mixture which includes the constituents of the azo dye to be formed with the beta or alpha naphthol. Hence immediately after the application of this mixture the required azo color forms on the cotton. Now if such cotton were immersed in a solution of indigo the whole or part of the azo dye would naturally be covered over by the blue indigo color. To obviate this, there are added to the mixture above referred to certain substances which are calculated to prevent the blue indigo color from becoming fixed at those parts of the cotton where azo color already exists. There are many substances which will effect this, and their applicability depends upon the properties peculiar to the azo color to be protected in any given case. Thus all salts of copper, zinc, mercury, lead, or alumina may be so employed. A slight addition of nitric acid will enhance their effectiveness. Fatty substances, such as turpentine-oil, will also prove serviceable. An addition of pipe-clay in conjunction with "gum" and the salts employed will serve to form a stiff cement, which hardens as it dries and resists the tendency of the indigo to penetrate into the cotton. A particularly favorable effect is in this case produced by the presence of bichromate of sodium or of potassium, which in the acid reaction that takes place after dyeing in indigo solution is well known to develop chromic acid, and this being a powerful oxidizing agent will relieve the azo colors of any trace of indigo there may be left in them, which unless eliminated will become fixed, notwithstanding the action of the preserving substances used. It will of course be readily understood that the bichromate can only be added where the azo dye employed is indifferent to the action of chromic acid. After dyeing in the indigo solution the cotton is washed and passed through a bath of sulfuric acid or hydrochloric acid. Where the protective dye contains chrome, it may in some cases be preferable to use a bath composed of one of the two acids above named and of oxalic acid. After this, as all the remaining bodies are done away with by the treatment with acid, the azo color as at first evolved will reappear in all its purity.

The fixing of para-nitro-anilin red over indigo may serve as an example of the performance of the process described. The cotton is mordanted in a solution of twenty-five grams of beta-naphthol, forty grams of soda-lye at 22° Baumé, thirty grams of Turkey-red oil, and one liter of water. The material is dried and then printed with a dye composed as follows: one hundred and fifty grams of water, two hundred and eighty-five grams of sulfate of zinc, one hundred and fifty grams of sugar of lead, one hundred and eighty-five grams of nitrate of lead, one hundred and fifty grams of white lead, one hundred grams of gum, fifty grams of kaolin, and thirty grams of mercuric chlorid. Kaolin and mercuric chlorid may, however, in this case be dispensed with, if desired, gum supplying their place. With this preparation is mixed the diazo solution of the para-nitro-anilin consisting of twenty-eight grams of para-nitro-anilin, fifteen grams of nitrate of sodium, fifty grams of cold water, six hundred grams of wheat-starch thickener, (or adragant gum,) forty grams of hydrochloric acid at 22°

Baumé, and two hundred and ten grams of water. To this dye when ready fifty grams of bichromate of sodium per liter of dye is superadded. Instead of the diazo solution described azophore N of the highest dyeing power, which is very convenient to use, may be employed. If so, sixty-six grams of azophore N, dissolved in sixty grams of water, is added to the reserve dye mentioned above, and lastly the above-named quantity of bichromate of sodium is superadded. After printing, the cotton is placed in a vat with indigo solution, the degree of concentration of which should correspond to the quality of shade of blue required, and after the completion of the dyeing process it is washed and passed through a sulfuric-acid bath, either cold or warm, until the fiery red color of the para-nitro-anilin red appears in all its purity. It will be readily understood that the entire process can be carried out so much easier if the cotton treated has previously been "mercerized."

In the same manner as para-nitro-anilin there may be used diazo solutions of alpha-naphthylamin, para-nitro-ortho-toluidin, azophore orange of the highest power, the "nitrosamin" red of the Badische Anilin and Soda Fabrik, dianisidin blue, azophore black of the highest power, and, in fact, any diazo solution compatible with the preserving media mentioned above and not liable to destruction by contact with them. A very beautiful article may be obtained by combining the azo colors above named with the usual "reserve" colors. Thus white from lead "reserves" or copper reserves and yellow from copper reserves may be united with chromate of lead, anilin black, or the like, by which means a new variety of what is known as "illuminated" goods with a red background will be produced. If a little ferrocyanid of potassium or ferricyanid of potassium be added to the beta-naphthol preparation, basic coloring agents may be added and mixed with the protective coating, auramin, methylene blue, light green, malachite green, and the like being among the colors which may be so used. These colors will in that case become fixed along with paranitro-anilin red and indigo as fast and wash-resisting dyes if treated in the same manner as in the case of red alone, whereby a vast variety of brilliant colors will be obtained.

In conclusion it is once more pointed out that the fiber is in no way weakened by this process, while owing to the simplicity of the operations the process, unlike any of the methods hitherto devised with the same object, is perfectly reliable.

What I claim as my invention, and desire to secure by Letters Patent, is—

1. The process of dyeing textile material, which consists in first treating the whole of the material with a mordant containing naphthol, then printing portions of the material with a dye mixture containing the azo dye and a reserve, so that the required azo color is formed on the material, then dyeing the material with indigo, and finally treating it with acid, substantially as set forth.

2. The process of dyeing textile material, which consists in first treating the whole of the material with a mordant containing naphthol and ferrocyanid of potassium, then printing portions of the material with a dye mixture containing the azo dye and a reserve, so that the required azo color is formed on the material, then dyeing the material with indigo, and finally treating it with acid, substantially as set forth.

In testimony whereof I have signed my name to this specification in the presence of two subscribing witnesses.

ERNESTO LURATI.

Witnesses:
ALVESTO S. HOGUE,
THOS. WINKELMANN.